US010669825B2

(12) United States Patent
Clingman et al.

(10) Patent No.: US 10,669,825 B2
(45) Date of Patent: Jun. 2, 2020

(54) ELECTRICALLY POWERED MOTOR LUBRICANT PRESSURE COMPENSATOR FOR SUBMERSIBLE PUMP MOTOR

(71) Applicant: Baker Hughes

(72) Inventors: James Christopher Clingman, Broken Arrow, OK (US); Ryan P. Semple, Owasso, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 368 days.

(21) Appl. No.: 15/830,140

(22) Filed: Dec. 4, 2017

(65) Prior Publication Data
US 2018/0171766 A1   Jun. 21, 2018

Related U.S. Application Data

(60) Provisional application No. 62/435,134, filed on Dec. 16, 2016.

(51) Int. Cl.
| | | |
|---|---|---|
| *E21B 43/12* | (2006.01) | |
| *E21B 4/00* | (2006.01) | |
| *F04D 13/10* | (2006.01) | |
| *H02K 5/132* | (2006.01) | |
| *H02K 7/00* | (2006.01) | |
| *F04D 13/08* | (2006.01) | |

(52) U.S. Cl.
CPC ............. *E21B 43/128* (2013.01); *E21B 4/003* (2013.01); *F04D 13/10* (2013.01); *H02K 5/132* (2013.01); *H02K 7/00* (2013.01); *F04D 13/086* (2013.01); *H02K 2205/09* (2013.01)

(58) Field of Classification Search
CPC ...... H02K 5/132; H02K 5/128; H02K 5/1285; H02K 2205/09; E21B 4/003; E21B 43/128; F04D 13/086; F04D 13/10; F04B 11/0008; F04B 11/0033
USPC .................................................. 417/414, 540
See application file for complete search history.

(56) References Cited

U.S. PATENT DOCUMENTS

| | | | | |
|---|---|---|---|---|
| 2,478,706 | A * | 8/1949 | Peters ................... | F04D 13/062 417/414 |
| 2,790,916 | A * | 4/1957 | Hinman ................. | H02K 5/132 310/87 |
| 4,477,235 | A * | 10/1984 | Gilmer ................... | H02K 5/132 417/414 |

(Continued)

OTHER PUBLICATIONS

International Search Report and Written Opinion dated Mar. 16, 2018 for corresponding PCT/US2017/064498.

*Primary Examiner* — Charles G Freay
(74) *Attorney, Agent, or Firm* — Bracewell LLP; James E. Bradley

(57) ABSTRACT

An electrical submersible well pump assembly includes an electrical motor for driving a pump. A pressure compensating chamber contains a dielectric lubricant in fluid communication with an interior of the motor. A movable pressure compensating element has a first side in contact with the lubricant in the chamber. Movement of the element relative to the chamber causes a change in volume of the chamber. An electrical drive mechanism is connected with and moves the element. A controller senses a pressure difference between the lubricant pressure and the well fluid pressure and operates the drive mechanism in response. The element may be a piston, a bellows or telescoping tubes.

20 Claims, 4 Drawing Sheets

(56) References Cited

U.S. PATENT DOCUMENTS

| | | | | |
|---|---|---|---|---|
| 4,583,923 | A | * | 4/1986 | James ............... F04B 47/06 |
| | | | | 310/87 |
| 4,751,939 | A | * | 6/1988 | Barnay ............ E21B 33/0355 |
| | | | | 137/176 |
| 6,851,935 | B2 | | 2/2005 | Merrill et al. |
| 7,520,735 | B2 | | 4/2009 | Merrill et al. |
| 7,665,975 | B2 | | 2/2010 | Parmeter et al. |
| 7,708,534 | B2 | | 5/2010 | Parmeter |
| 8,096,790 | B2 | * | 1/2012 | Sadatomi ........... F04C 15/0049 |
| | | | | 417/312 |
| 8,221,092 | B2 | | 7/2012 | Chilcoat et al. |
| 8,337,179 | B2 | * | 12/2012 | Boock ............... F15B 1/021 |
| | | | | 417/540 |
| 8,932,034 | B2 | | 1/2015 | McKinney et al. |
| 9,366,120 | B2 | | 6/2016 | Merrill et al. |
| 2004/0136849 | A1 | | 7/2004 | Du et al. |
| 2007/0224056 | A1 | | 9/2007 | Watson et al. |
| 2010/0172773 | A1 | | 7/2010 | Watson et al. |
| 2014/0105759 | A1 | * | 4/2014 | Henry ............... F04B 47/02 |
| | | | | 417/53 |
| 2015/0114662 | A1 | | 4/2015 | Hendryx |
| 2015/0330400 | A1 | | 11/2015 | Tanner et al. |
| 2015/0354327 | A1 | | 12/2015 | Semple et al. |
| 2016/0145984 | A1 | | 5/2016 | Tetzlaff et al. |
| 2016/0312591 | A1 | | 10/2016 | Pyron et al. |
| 2016/0312785 | A1 | | 10/2016 | Meyer et al. |
| 2017/0037861 | A1 | | 2/2017 | Rutter et al. |

* cited by examiner

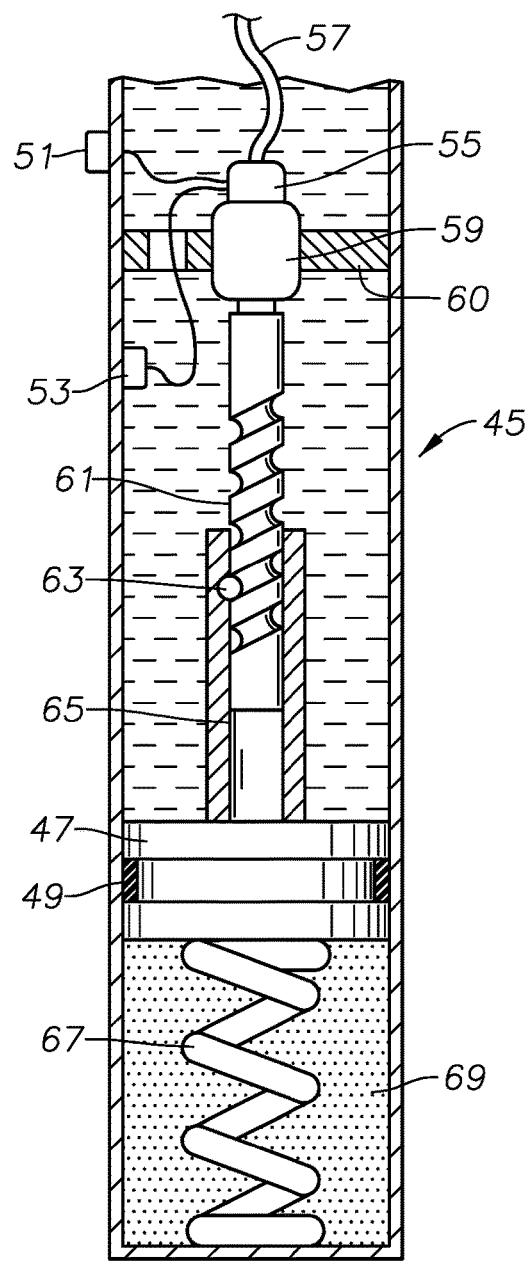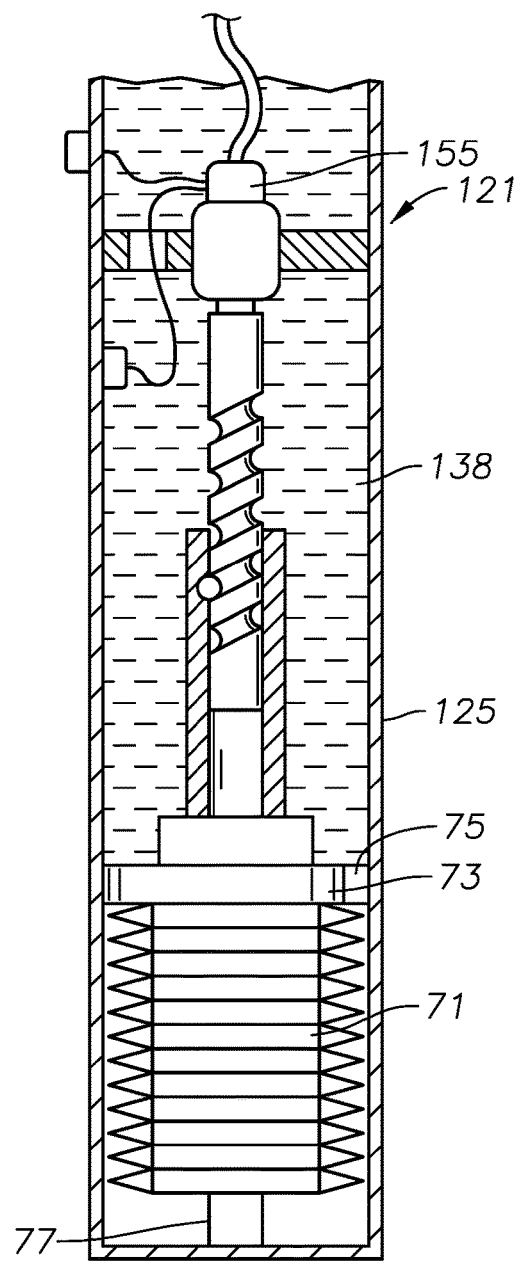
FIG. 3
FIG. 4

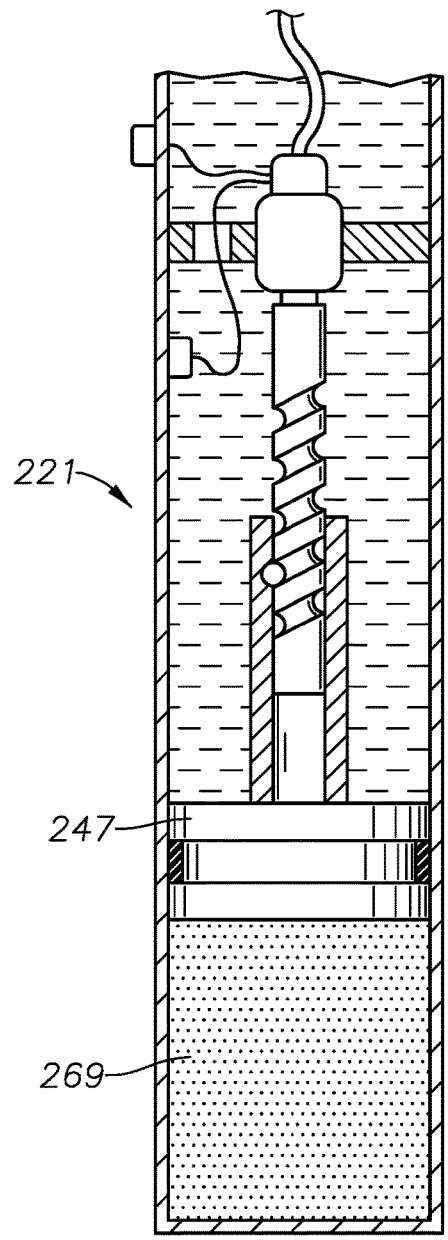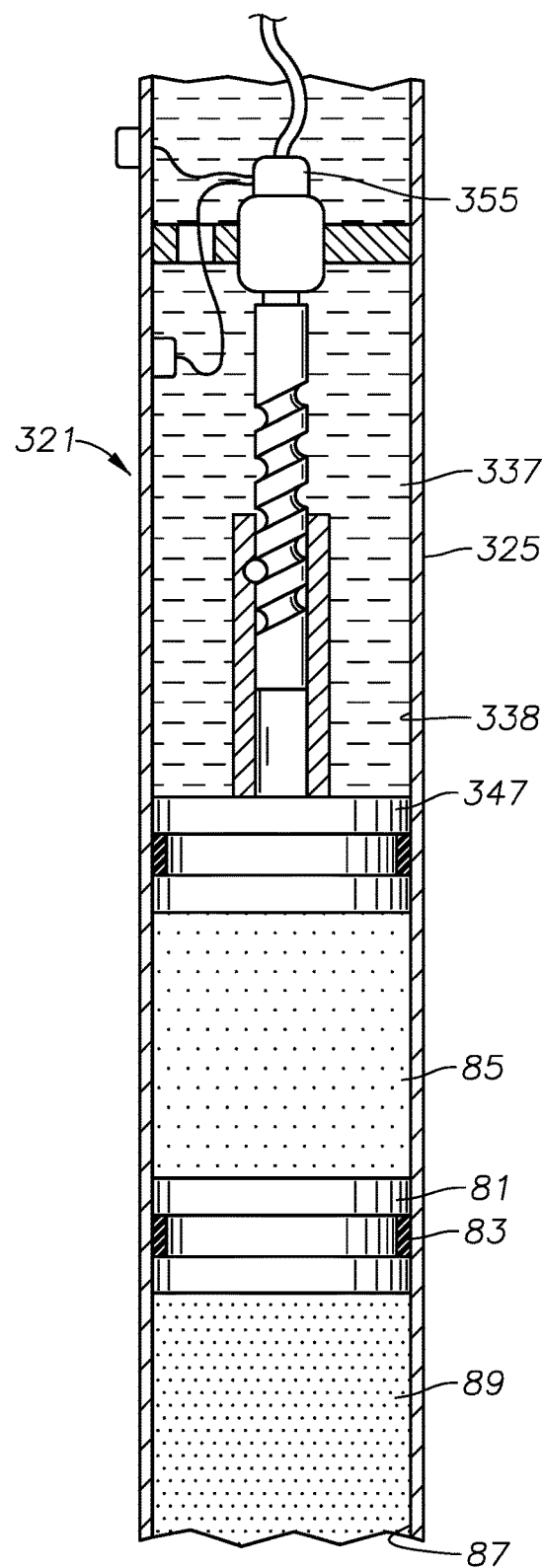
FIG. 5
FIG. 6

ELECTRICALLY POWERED MOTOR LUBRICANT PRESSURE COMPENSATOR FOR SUBMERSIBLE PUMP MOTOR

CROSS-REFERENCE TO RELATED APPLICATION

This application claims priority to provisional application Ser. No. 62/435,134, filed Dec. 16, 2016.

FIELD OF THE DISCLOSURE

The present disclosure relates to electrical submersible pump systems for well bore fluids, and more specifically to an electrically driven pressure compensator for motor lubricant in the motor.

BACKGROUND

Many hydrocarbon wells are produced by electrical submersible well pump assemblies (ESP). A typical ESP includes a centrifugal pump having a large number of stages, each stage having an impeller and a diffuser. An electrical motor couples to the pump for rotating the impellers.

A pressure equalizer or seal section connects to the motor to reduce a pressure differential between lubricant in the motor and the hydrostatic pressure of the well fluid. The pressure equalizer has a motor lubricant passage leading from a flexible barrier, such as a bag or bellows, into the interior of the motor. The motor lubricant passage is always open to communicate well fluid pressure applied in the pressure equalizer to the flexible barrier to the motor lubricant in the motor. Normally, a well fluid passage leads into the pressure equalizer to a side of the flexible barrier opposite the side in contact with lubricant.

With most prior art ESP's, the pressure equalizer or seal section is located between the motor and the pump. In others, the pressure equalizer is mounted below the motor. Whether above or below, the movement of the flexible barrier occurs only in direct response to forces exerted by the well fluid and lubricant on the flexible barrier.

SUMMARY

An electrical submersible pump assembly for pumping well fluid from a well has an electrical motor for driving a pump. A pressure compensating chamber containing a dielectric lubricant is in fluid communication with an interior of the motor. A movable pressure compensating element has a first side in contact with the lubricant in the chamber. Movement of the element relative to the chamber causes a change in volume of the chamber. An electrical drive mechanism connected with the element moves the element relative to the chamber. A controller operates the drive mechanism in response to a difference between a pressure of the lubricant in the chamber and a pressure of well fluid on an exterior of the motor.

The element may comprise a piston that is in sliding engagement with a side wall of the chamber. A spring may be compressed against a second side of the piston. A lower portion of the housing may be filled with a pressurized gas that exerts a force against the lower side of the piston. The spring may be positioned within the pressurized gas portion of the chamber.

Alternately, the element may comprise a bellows. The first side of the element comprises an exterior of the bellows, which is immersed in the lubricant in the chamber. The drive mechanism couples to a first end of the bellows for moving the first end of the bellows relative to a second end of the bellows. A well fluid port may provide well fluid to an interior of the bellows.

Alternately, the element may comprise a sealed enclosure within the chamber. The enclosure has first and second components that are moveable relative to each other to change the overall volume of the enclosure. The enclosure has an exterior that comprises the first side of the element and is immersed in the lubricant in the chamber. The drive mechanism is coupled to the first component for moving first component relative to the second component to change a volume of the enclosure.

In the embodiment shown, the drive mechanism comprises a servo motor shaft. A servo motor rotates the shaft. A rotary to linear translator translates rotation of the servo motor shaft to linear movement. The element is coupled to the linear translator for linear movement therewith.

In another embodiment, a first piston is stroked by the drive mechanism between a larger chamber volume position and a smaller chamber volume position. A second piston has a first side facing the first piston and a second side. A well fluid port in the chamber admits well fluid from an exterior of the motor to the second side of the second piston. A protective barrier fluid is located between and in contact with the first and second pistons.

BRIEF DESCRIPTION OF THE DRAWINGS

FIG. 3 is an enlarged sectional view of a motor lubricant pressure compensator of the motor of FIG. 2.

FIG. 4 is a sectional view of a first alternate embodiment of the motor lubricant pressure compensator of FIG. 3.

FIG. 5 is a sectional view of a second alternate embodiment of the motor lubricant pressure compensator of FIG. 3.

FIG. 6 is a sectional view of a third alternate embodiment of the motor lubricant pressure compensator of FIG. 3.

Figure 1:
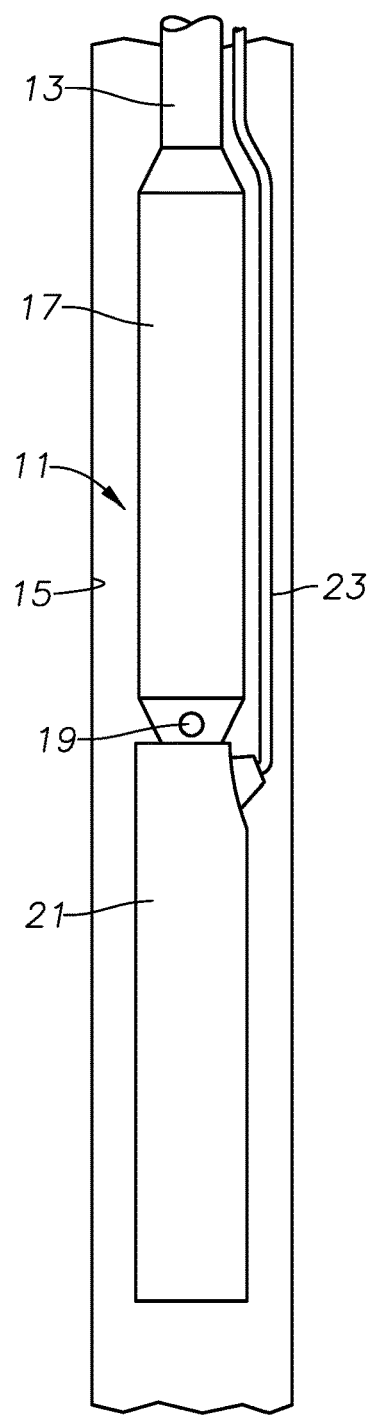
FIG. 1 is a schematic view of an electrical submersible pump assembly in accordance with this invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 illustrates an electrical submersible pump ("ESP") 11 suspended on a string of production tubing 13 within casing 15 in a well. ESP 11 includes a pump 17 with an intake 19 for drawing in well fluid. Pump 17 may be a centrifugal pump having a large number of stages, each stage having an impeller and a diffuser. Alternately, pump 17 may be another type, such as a progressing cavity pump.

A pump motor 21 drives pump 17 and is normally located below pump 17. Pump motor 21 is a three-phase electrical motor. A power cable 23 extends from the surface alongside production tubing 13. A motor lead portion on the lower end of power cable 23 secures to pump motor 21 to supply power.

Figure 2:
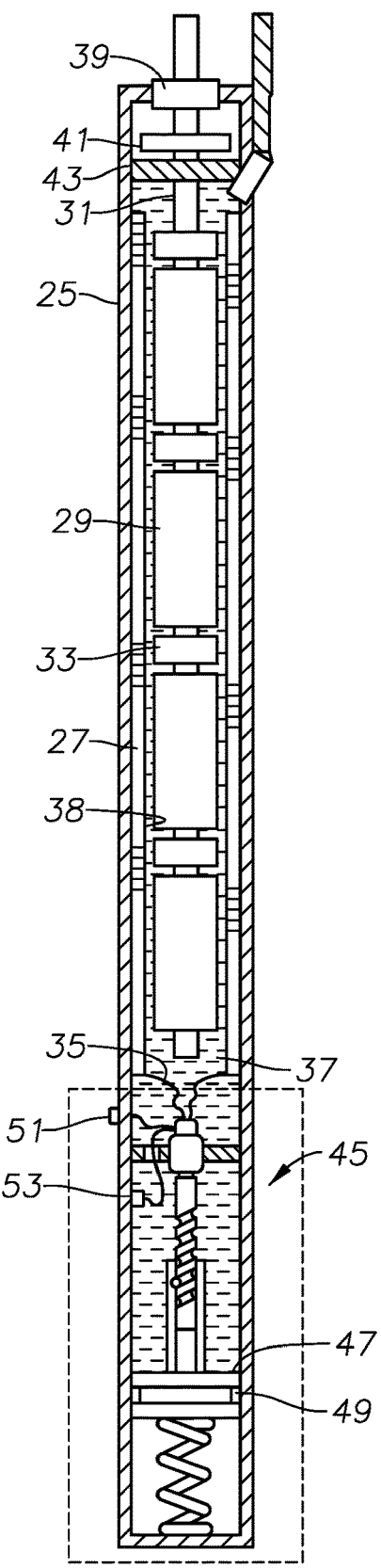
FIG. 2 is a schematic sectional view of the motor of the pump assembly of FIG. 1.

Referring to FIG. 2, pump motor 21 has a tubular housing 25, which is shown schematically as a single piece member, but may include several components secured together, such as by threads. A stator 27 is rigidly secured within housing 25, Stator 27 is made up of a large number of thin metal disks or laminations. Windings (not shown) extend through slots in the disks. A rotor made up of a number of rotor sections 29 locates within a bore defined by central openings in the disks of stator 27. Rotor sections 29 are also made up of a large number of thin metal disks. Copper rods extend through slots in the rotor disks. A motor shaft 31 extends through rotor sections 29 for rotation in unison. Radial bearings 33 located between each rotor section 29 frictionally engage the bore of stator 27 and provide radial support for motor shaft 31. The phases of the windings of stator 27 are secured together at the lower end of stator 27 at a wye point 35.

The interior of housing 25 defines a chamber 38 containing a dielectric motor lubricant 37 for lubricating bearings 33. A main shaft seal 39 seals lubricant 37 from contact with well fluid on the exterior of pump motor 21. Main seal 39 is commonly a face seal having a rotating member that slidably engages a stationary member. A thrust bearing comprising a thrust runner 41 and a thrust base 43 is located within chamber 38 below main seal 39 for absorbing axial thrust on motor shaft 31. Thrust runner 41 rotates with motor shaft 31 and slides against the upper side of thrust base 43. Thrust base 43 has ports (not shown) that allow lubricant to pass from below to above thrust base 43 for lubricating the interface with thrust runner 41.

The upper end of motor shaft 31 couples to a pump shaft (not shown) for driving pump 17. A separate pump shaft thrust bearing unit (not shown) for absorbing thrust on the pump shaft could be mounted in a module between pump motor 21 and pump intake 19. Optionally, main seal 39 could be mounted at the upper end of the thrust bearing module so that motor lubricant 37 in housing 25 communicates with lubricant in the pump shaft thrust bearing unit. Another alternate would be to have a magnetic coupling (not shown) connecting pump motor 21 to pump 17. The thrust bearing could be located in part of the housing for pump 17.

Pump motor 21 has a motor lubricant pressure compensator 45, which is shown enclosed by dotted lines in FIG. 2. In the embodiments shown, pressure compensator 45 is located within housing 25 below stator 27 and motor shaft 31. Pressure compensator 45 serves to control the internal pressure of motor lubricant 37 in chamber 38. The well fluid where ESP 11 is located can have several thousand pounds per square inch of hydrostatic pressure, depending on the depth of the well fluid in casing 11 above ESP 11. Also, when pump motor 21 is operating, it heats up, causing motor lubricant 37 in chamber 38 to thermally expand and increase the motor lubricant pressure.

A negative pressure differential across main seal 39, that is, one with a higher hydrostatic pressure than internal lubricant pressure, can cause detrimental amounts of well fluid to leak into chamber 38. A positive pressure differential across main seal 39, with the lubricant pressure being higher than the hydrostatic pressure, avoids encroachment of well fluid into chamber 38. However, if the positive differential is too high, excessive motor lubricant 37 may leak out past main seal 39, depleting the lubricant within chamber 38. A zero pressure differential across main seal 39 avoids well fluid from entering chamber 38 and also prevents motor lubricant 37 from leaking out of chamber 38. However, main seal 39 operates best under a small pressure differential to provide a fluid film between the rotating and nonrotating components. Pressure compensator 45 provides careful control of the internal pressure of motor lubricant 37.

Pressure compensator 45 selectively increases and decreases the volume of motor housing chamber 38 to maintain a desired pressure difference. In the embodiment of FIGS. 2 and 3, pressure compensator 45 includes a movable pressure compensating element that comprises a piston 47. Piston 47 has a seal 49 that slides axially and seals against an inner surface of housing 25. The upper side of piston 47 defines a lower end of chamber 38 and is in contact with motor lubricant 37.

An external pressure sensor 51, which may be mounted on the exterior of housing 25, senses the hydrostatic pressure of well fluid on the exterior of housing 25. An internal sensor 53, which may be mounted on the inner surface of housing 25, senses the pressure of motor lubricant 37 in chamber 38. A controller 55 mounted in housing 25 is connected by wires to sensors 53, 55 to receive signals from them. Alternately, instead of separate sensors 51, 53, controller 55 could receive signals from a conventional pressure and temperature sensing unit mounted to the lower end of pump motor 21. Controller 55 may have power wires 57 that lead to wye point 35 (FIG. 2) for receiving power while power is being supplied to pump motor 21. Controller 55 controls an electrical servo motor 59 in response to signals being received to cause axial movement of piston 47 relative to housing 25. Controller 55 and servo motor 59 may be mounted on a bracket 60 in motor housing 25 and immersed in motor lubricant 37.

The drive mechanism also includes a linkage between servo motor 59 and piston 47. Various drive linkages are feasible to cause servo motor 59 to axially move piston 47. In this embodiment, servo motor 59 has a rotating output shaft that comprises a lead screw 61 with a helical thread form. Lead screw 61 has a pawl 63, which may be one or more ball bearings, that engages its threads as well as internal threads of a pawl carrier 65. Pawl carrier 65 is a sleeve rigidly mounted to the upper side of piston 47. Lead screw 61 extends into the interior of pawl carrier 65. Lead screw 61 and pawl carrier 65 serve as a rotary to linear translator, with rotation of lead screw 61 causing linear movement of pawl carrier 65 and piston 47.

If controller 55 senses that the pressure of motor lubricant 37 should be increased, it will cause servo motor 59 to rotate lead screw 61 in a direction causing piston 47 to move upward, decreasing the volume of chamber 38. If controller 55 senses that the pressure of motor lubricant 37 should be decreased, it will cause servo motor 59 to rotate lead screw 61 in an opposite direction, causing piston 47 to move downward, increasing the volume of chamber 38.

While pump motor 21 is not operating, there will be no power at wye point 35. Thus, rather than using power from wye point 35, a separate instrument wire extending from the wellhead could provide power to controller 55 independently of power being supplied to pump motor 21. Alternately, a battery (not shown) optionally may power pressure controller 45 while power is not being supplied to pump motor 21.

In addition, a bias mechanism may be employed to move piston 47 to a desired pressure location in chamber 38 without electrical power being supplied to controller 55. In this embodiment, the bias mechanism operates independently of the hydrostatic pressure of the well fluid. The bias mechanism is pre-set prior to installing ESP 11 to provide a lubricant 37 pressure that is nearly equal or slightly higher than the anticipated hydrostatic pressure of the well fluid once ESP 11 is installed.

In FIG. 3, the bias mechanism includes a coil spring 67 that acts on the lower side of and urges piston 47 upward in housing 25. Further, FIG. 3 illustrates a pressurized gas filled chamber 69 between the closed lower end of housing 25 and piston 47. The pressure of the gas in gas filled chamber 69 also exerts an additional upward force on piston 47. Coil spring 67 is located within gas filled chamber 69 in this example.

In one embodiment, servo motor 59 and lead screw 61 are configured so that upward movement of piston 47 caused by coil spring 67 and gas filled chamber 69 will cause lead screw 61 to spin or freewheel while servo motor 59 is under no power. The combined bias of coil spring 67 and the gas in gas filled chamber 69 will apply a desired pressure to lubricant 37 even while pump motor 21 is shut off. In some instances, pump motor 21 may be shut down for a lengthy period of time, particularly when pump motor 21 is part of a backup ESP installed within a well along with a primary ESP. Optionally, while pump 21 is shut down, volume adjustments could be made by power, either through a battery or a separate instrument line extending from the surface. Also, coil spring 67 and gas filled chamber 69 provide an assist for servo motor 59 while power is being supplied to pump motor 21, reducing the amount of energy required of servo motor 59 to move piston 47 upward. In the FIGS. 2 and 3 embodiment, well fluid is not admitted to housing 25, other than through possible slight leakage through main seal 39.

Many of the components of the alternate embodiments of FIGS. 4-7 are the same as in FIGS. 2 and 3 need not be discussed again. Instead of the bias mechanism being a coil spring and pressurized gas filled chamber, a bellows 71 may be employed, as shown in FIG. 4. Bellows 71 is illustrated as being a metal corrugated side wall member having a desired stiffness against contraction and extension from a neutral point. A guide 73 on the upper end of bellows 71 may touch but does not seal to the inner surface of housing 125 during contraction and extension. Slots or scallops 75 on the perimeter of guide 73 assure that motor lubricant 138 can flow below guide 73 and surround the exterior and lower end of bellows 71. The lower end of bellows 71 is secured to a well fluid inlet tube 77, which in turn is secured to the lower end of housing 125. Tube 77 prevents upward and downward movement of the lower end of bellows 71 during contraction and extension. Tube 77 is open to admit well fluid into the interior of bellows 71. The lower end of bellows 71 is closed except for the sealed opening for tube 77.

While pump motor 121 is being lowered into the well, well fluid admitted through tube 77 will be at the hydrostatic pressure of the well fluid on the exterior of housing 125. This hydrostatic pressure causes bellows 71 to elongate, moving guide 73 upward. The expansion of bellows 71 reduces the volume of the portion of chamber 138 containing motor lubricant, thereby increasing the lubricant pressure in chamber 138 even though controller 155 is not being powered. Once motor 121 receives power, controller 155 will control the desired pressure difference by contracting and extending bellows 71.

The embodiment of FIG. 5 is similar to FIG. 3 in that it has a pressurized gas filled chamber 269. However, chamber 269 does not have a coil spring exerting a bias force against piston 247. The pre-charged pressure in gas filled chamber 269 serves as a bias means and acts on piston 247 prior to lowering motor 221 in the well. The pressure in gas filled chamber 269 may be selected to provide a small positive differential over the well fluid pressure while pump motor 121 is not being powered.

In the FIG. 6 embodiment, a lower piston 81 with a seal 83 is located below piston 347. Lower piston 81 slides and seals on the inner surface of housing 325, creating a sealed but movable barrier fluid chamber between lower piston 81 and piston 347. A protective barrier fluid 85 is located in the barrier fluid chamber between piston 347 and lower piston 81. Protective barrier fluid 85 is preferably a liquid and may be the same as motor lubricant 337.

The lower end 87 of housing 325 is open, admitting well fluid 89 into contact with the lower side of lower piston 81. The hydrostatic pressure of well fluid 89 will exert an upward force on lower piston 81, which transfers that force through protective barrier fluid 85 to piston 347. While pump motor 321 is not operating, pistons 81, 347 and protective barrier fluid 85 will cause the pressure of motor lubricant 337 in chamber 338 to be substantially equal to the hydrostatic pressure of well fluid 89. When motor 321 begins to operate, controller 355 will move piston 347 upward and downward to maintain a desired pressure in chamber 338 relative to the hydrostatic pressure of well fluid 89. Protective barrier fluid 85 isolates well fluid 89 from contact with motor lubricant 337 in chamber 338.

Figure 7:
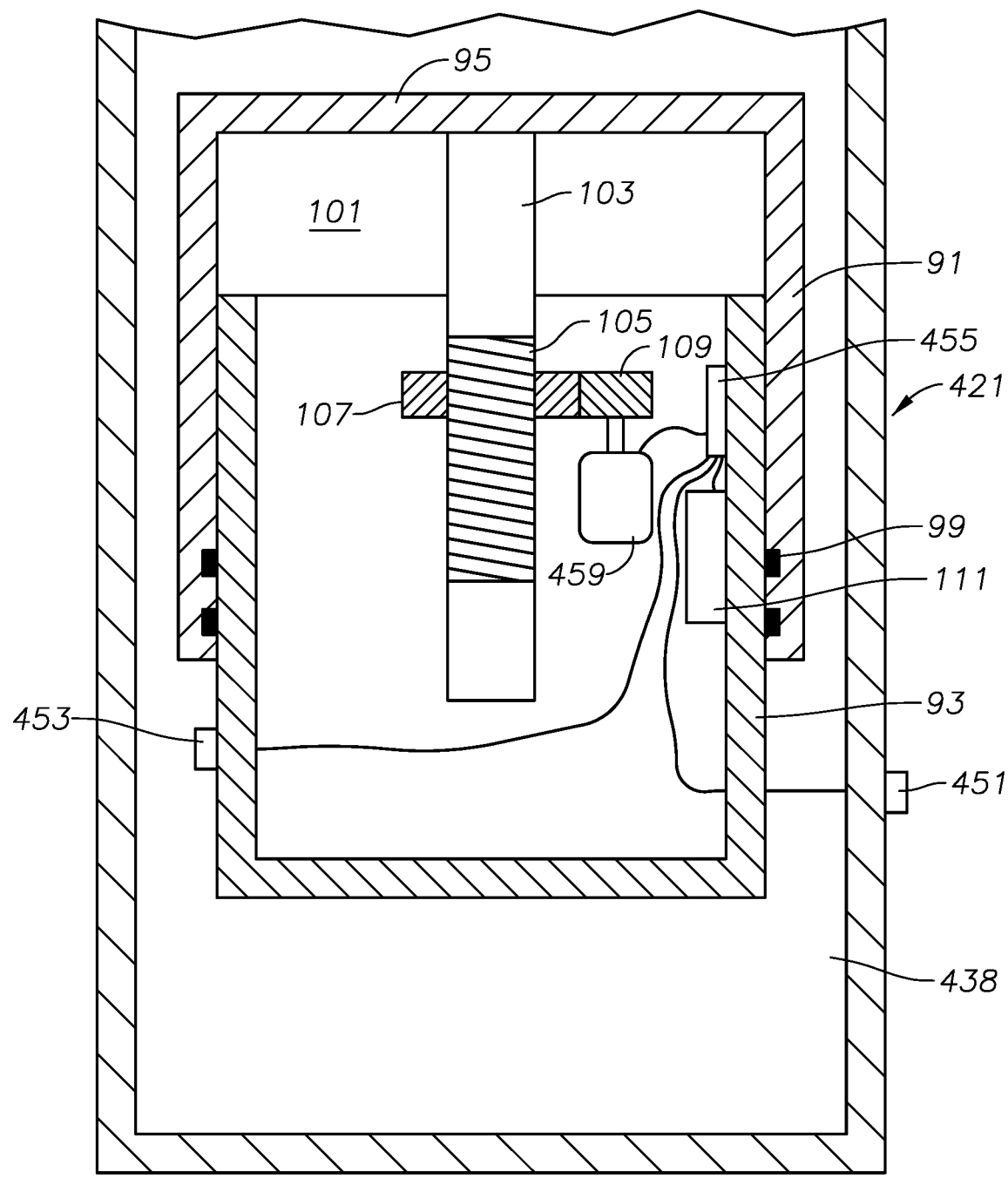
FIG. 7 is a sectional view of a fourth alternate embodiment of the motor lubricant pressure compensator of FIG. 3.

The pressure compensator element of FIG. 7 comprises a sealed enclosure made up of telescoping tubes 91, 93 having internal open ends and external closed ends 95, 97, respectively. Seals 99 seal between the cylindrical side walls of tubes 91, 93. Telescoping tubes 91, 93 define an internal chamber 101 that enlarges and shrinks as tubes 91, 93 extend and contract relative to each other. As tubes 91, 93 extend, they reduce the volume of lubricant chamber 438 in pump motor 421.

In this example, the extension and contraction mechanism is located inside of tubes 91, 93 and includes a non-rotating gear drive shaft 103. Gear drive shaft 103 has helical gear teeth 105 formed thereon. Gear drive shaft 103 is secured to one of the tube ends, which in this example, is tube end 95. A rotatable shaft gear 107 engages shaft gear teeth 105, causing gear drive shaft 103 to move up or down depending on the direction of rotation. A servo motor gear 109 of a servo motor 459 engages shaft gear 107 to cause it to rotate. A controller 455 connects to an external pressure sensor 451 on the exterior of motor 421 and to an internal pressure sensor 453 on the exterior of tube 93. An optional battery 111 may provide power to controller 455 and servo motor 459.

Controller 455 controls servo motor 421 to cause the volume of tube chamber 101 to expand and contract.

Tube chamber 101 may be pre-charged with a compressive gas to a selected level prior to running pump motor 421. The pre-charge will position tubes 91, 93 at a desired extension that creates an initial pressure in motor lubricant chamber 438 to match an expected hydrostatic pressure on the exterior of motor 421 when reaching the desired depth.

The present invention described herein, therefore, is well adapted to carry out the objects and attain the ends and advantages mentioned, as well as others inherent therein. While a several embodiments of the invention have been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:

1. An electrical submersible pump assembly for pumping well fluid from a well, comprising:
   an electrical pump motor for driving a pump;
   a pressure compensating chamber containing a dielectric lubricant that is in fluid communication with an interior of the pump motor;
   a movable pressure compensating element having a first side in contact with the lubricant in the chamber, wherein movement of the element relative to the chamber causes a change in volume of the chamber;
   an electrical drive mechanism connected with the element for moving the element relative to the chamber; and
   a controller that operates the drive mechanism in response to a difference between a pressure of the lubricant in the chamber and a pressure of well fluid on an exterior of the pump motor.

2. The assembly according to claim 1, wherein:
   the element comprises a piston that is in sliding engagement with a side wall of the chamber.

3. The assembly according to claim 1, wherein the element comprises:
   a piston that slides in sealing engagement against a side wall of the chamber; and wherein the assembly further comprises:
   a spring compressed against a second side of the piston.

4. The assembly according to claim 1, wherein:
   the chamber is within a housing at a lower end of the pump motor;
   the element comprises a piston that slides in the housing and separates lubricant in an upper portion of the housing from a lower portion of the housing; wherein the assembly further comprises:
   a spring in the lower portion of the housing and compressed against a lower side of the piston; and
   wherein the lower portion of the housing is filled with a pressurized gas that exerts a force against the lower side of the piston.

5. The assembly according to claim 1, wherein:
   the element comprises a bellows having an interior open to well fluid, the first side of the element comprising an exterior of the bellows, which is immersed in the lubricant in the chamber; and
   the drive mechanism couples to a first end of the bellows for moving the first end of the bellows relative to a second end of the bellows.

6. The assembly according to claim 1, further comprising bias means for biasing the element toward a smaller chamber volume position.

7. The assembly according to claim 1, wherein:
   the chamber contains a pressurized gas that acts against a second side of the element.

8. The assembly according to claim 1, wherein the element comprises:
   a first piston that is stroked by the drive mechanism between a larger chamber volume position and a smaller chamber volume position; and wherein the assembly further comprises:
   a second piston having a first side facing the first piston and a second side;
   a well fluid port in the chamber for admitting well fluid from an exterior of the pump motor to the second side of the second piston; and
   a protective barrier fluid located between and in contact with the first and second pistons.

9. The assembly according to claim 1, wherein the drive mechanism comprises:
   a servo motor shaft;
   a servo motor that rotates the shaft;
   a rotary to linear translator that translates rotation of the servo motor shaft to linear movement; and wherein
   the element is coupled to the linear translator for linear movement therewith.

10. The assembly according to claim 1, wherein:
    the element comprises a sealed enclosure within the chamber, the enclosure having first and second components that are moveable relative to each other, the enclosure having an exterior that comprises the first side of the element and is immersed in the lubricant in the chamber; and
    the drive mechanism is coupled to the first component for moving first component relative to the second component to change a volume of the enclosure.

11. An electrical submersible pump assembly for pumping well fluid from a well, comprising:
    an electrical pump motor for driving a pump;
    a pressure compensating chamber containing a dielectric lubricant that is in fluid communication with an interior of the pump motor;
    a movable pressure compensating element within the chamber, wherein movement of the element relative to the chamber causes a change in volume of the chamber;
    an external pressure sensor that senses a pressure of well fluid on an exterior of the pump motor;
    an internal pressure sensor that senses a pressure of the lubricant in the chamber; and
    an electrical drive mechanism coupled to the element for moving the element relative to the chamber in response to signals from the internal and external pressure sensors.

12. The assembly according to claim 11, wherein:
    the element comprises a piston coupled to the drive mechanism.

13. The assembly according to claim 11, wherein:
    the element comprises a bellows having a movable end and a fixed end; and
    the movable end is coupled to the drive mechanism.

14. The assembly according to claim 11, wherein:
    the element comprises first and second telescoping tubes that sealingly engage each other; and
    the first telescoping tube is coupled to the drive mechanism.

15. The assembly according to claim 11, further comprising:
a spring compressed against the element to urge the element toward a smaller chamber volume position.

16. The assembly according to claim 11, further comprising:
a pressurized gas acting against the element to urge the element toward a smaller chamber volume position.

17. The assembly according to claim 11, wherein:
the element has a first side in contact with the lubricant in the chamber; and the assembly further comprises:
a well fluid entry port within the chamber for admitting well fluid into the chamber into contact with a second side of the element.

18. An electrical submersible pump assembly for pumping well fluid from a well, comprising:
a pump;
an electrical pump motor operatively coupled to the pump;
a pressure compensator housing at a lower end of the pump motor;
a pressure compensating element within the housing;
a dielectric lubricant in the housing in contact with a first side of the element, the first side defining a lubricant chamber within the housing, the dielectric lubricant in the lubricant chamber being in fluid communication with an interior of the pump motor;
an electrical drive mechanism in the housing coupled with the element for moving at least a portion of the element relative to the housing to vary a volume of the lubricant chamber; and
a controller that operates the drive mechanism in response to a difference between a pressure of the lubricant in the lubricant chamber and a pressure of well fluid on an exterior of the pump motor.

19. The assembly according to claim 18, wherein:
the element comprises a piston that is in sealing and sliding engagement with a side wall of the housing.

20. The assembly according to claim 18, wherein:
the element comprises a bellows having a movable end coupled to the drive mechanism and a fixed end fixed to the housing;
the first side of the element comprises an exterior surface of the bellows; and
the housing has a well fluid port for communicating well fluid from the exterior of the pump motor to an interior of the bellows.

* * * * *